(12) United States Patent
Bhurke et al.

(10) Patent No.: US 11,460,098 B2
(45) Date of Patent: Oct. 4, 2022

(54) DIFFERENTIAL AND ELECTROMAGNETIC DIFFERENTIAL WITH MAIN AND PILOT CLUTCHES

(71) Applicant: Eaton Intelligent Power Limited, Dublin (IE)

(72) Inventors: Pritam Bhurke, Pune (IN); Varsha M. Nemane, Ahmednagar (IN); Andrew N. Edler, South Homer, MI (US); Juan I. Giglio, Oak Park, MI (US); Sarvesh S. Kulkarni, Pune (IN)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/189,666

(22) Filed: Mar. 2, 2021

(65) Prior Publication Data

US 2021/0270354 A1    Sep. 2, 2021

(30) Foreign Application Priority Data

Mar. 2, 2020   (IN) .............................. 202011008898

(51) Int. Cl.
| | |
|---|---|
| *F16H 48/34* | (2012.01) |
| *F16H 48/22* | (2006.01) |
| *F16H 48/20* | (2012.01) |
| *F16D 23/12* | (2006.01) |
| *F16D 27/115* | (2006.01) |
| *F16H 48/08* | (2006.01) |

(52) U.S. Cl.
CPC ............. *F16H 48/34* (2013.01); *F16H 48/22* (2013.01); *F16D 27/115* (2013.01); *F16D 2023/123* (2013.01); *F16H 48/08* (2013.01); *F16H 2048/204* (2013.01); *F16H 2048/205* (2013.01); *F16H 2048/346* (2013.01)

(58) Field of Classification Search
CPC ... F16D 13/52; F16D 2023/123; F16D 27/115
See application file for complete search history.

(56) References Cited

U.S. PATENT DOCUMENTS

| | | | |
|---|---|---|---|
| 5,326,333 | A | 7/1994 | Niizawa et al. |
| 5,464,084 | A | 11/1995 | Aoki et al. |
| 5,911,643 | A | 6/1999 | Godlew et al. |
| 5,989,147 | A | 11/1999 | Forrest et al. |

(Continued)

FOREIGN PATENT DOCUMENTS

| | | |
|---|---|---|
| DE | 102010022344 A1 | 12/2011 |
| EP | 1304506 B1 | 3/2008 |

*Primary Examiner* — Ernesto A Suarez
*Assistant Examiner* — James J Taylor, III
(74) *Attorney, Agent, or Firm* — Mei & Mark, LLP

(57) ABSTRACT

A differential can comprise a pilot clutch, a main clutch, a first ball ramp configured to act on the pilot clutch, and a second ball ramp configured to actuate the main clutch when the pilot clutch acts on the second ball ramp. An electromagnetic differential can comprise a carrier, a stator mounted on the carrier, a pilot clutch in the carrier, and a main clutch in the carrier. An electromagnetic differential can comprise a carrier and a first side gear and a second side gear in the carrier. A pilot clutch can be in the carrier surrounding a portion of the first side gear. A main clutch can be in the carrier surrounding a portion of the pilot clutch and surrounding a portion of the first side gear.

19 Claims, 5 Drawing Sheets

(56) References Cited

U.S. PATENT DOCUMENTS

| | | | |
|---|---|---|---|
| 6,537,172 B1 | 3/2003 | McAuliffe, Jr. et al. | |
| 6,691,845 B2 * | 2/2004 | Showalter | F16D 25/02 |
| | | | 192/35 |
| 6,719,662 B2 * | 4/2004 | Forrest | F16H 48/22 |
| | | | 475/150 |
| 6,742,642 B1 * | 6/2004 | Stevenson | F16D 13/04 |
| | | | 192/54.52 |
| 6,755,763 B1 | 6/2004 | Goto et al. | |
| 6,848,550 B2 * | 2/2005 | Puiu | B60K 17/02 |
| | | | 192/35 |
| 6,948,604 B2 * | 9/2005 | Puiu | B60K 17/344 |
| | | | 180/249 |
| 8,678,971 B2 * | 3/2014 | Schmidt | F16H 48/30 |
| | | | 475/231 |
| 10,221,899 B2 * | 3/2019 | Moubarak | F16D 23/12 |
| 10,451,161 B2 | 10/2019 | Garcia et al. | |

* cited by examiner

DIFFERENTIAL AND ELECTROMAGNETIC DIFFERENTIAL WITH MAIN AND PILOT CLUTCHES

FIELD

This application provides a differential and electromagnetic differential with main and pilot clutch packs that can be actuated via first and second ball ramps.

BACKGROUND

Hydraulically actuated Limited Slip Differentials ("LSDs") have good response time and torque accuracy performance, however they are complex in architecture and are also high in cost. E-Lockers are fully locking differentials and are used for traction control events. Electromagnetic LSDs, also called electromagnetic limited slip differentials ("eMLSDs"), are lower in cost and can be used for traction and stability control events. However, traditionally, limited bias torque can be achieved with available electromagnetic LSD designs due to packaging constraints inside the differential carrier.

SUMMARY

The methods and devices disclosed herein overcome the above disadvantages and improves the art by way of a limited slip differential ("LSD") dual clutch architecture to achieve higher clutch torque capacity.

A differential can comprise a pilot clutch, a main clutch, a first ball ramp configured to act on the pilot clutch, and a second ball ramp configured to actuate the main clutch when the pilot clutch acts on the second ball ramp.

An electromagnetic differential can comprise a carrier, a stator mounted on the carrier, a pilot clutch in the carrier, and a main clutch in the carrier. A stator-actuated first ball ramp can be configured on the carrier to act on the pilot clutch. A second ball ramp in the carrier can be configured to actuate the main clutch when the pilot clutch is acted on.

An electromagnetic differential can comprise a carrier, a first side gear and a second side gear in the carrier, and a stator mounted on the carrier. A pilot clutch can be in the carrier surrounding a portion of the first side gear. A main clutch can be in the carrier surrounding a portion of the pilot clutch and surrounding a portion of the first side gear. A stator-actuated first ball ramp on the carrier can be configured to act on the pilot clutch. A second ball ramp in the carrier can be configured to actuate the main clutch when the pilot clutch is acted on.

A method for actuating an electromagnetic differential can comprise energizing a first ball ramp with a stator, actuating a pilot clutch via the first ball ramp, actuating a second ball ramp via the pilot clutch, and actuating a main clutch pack via the second ball ramp. The method can further comprise determining a control signal to the stator by processing one or more of a differential oil temperature, a wheel speed, a vehicle speed, a steering angle and an accelerator position, the control signal to the stator controlling a torque output of the electromagnetic differential.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

DETAILED DESCRIPTION

Figure 1:
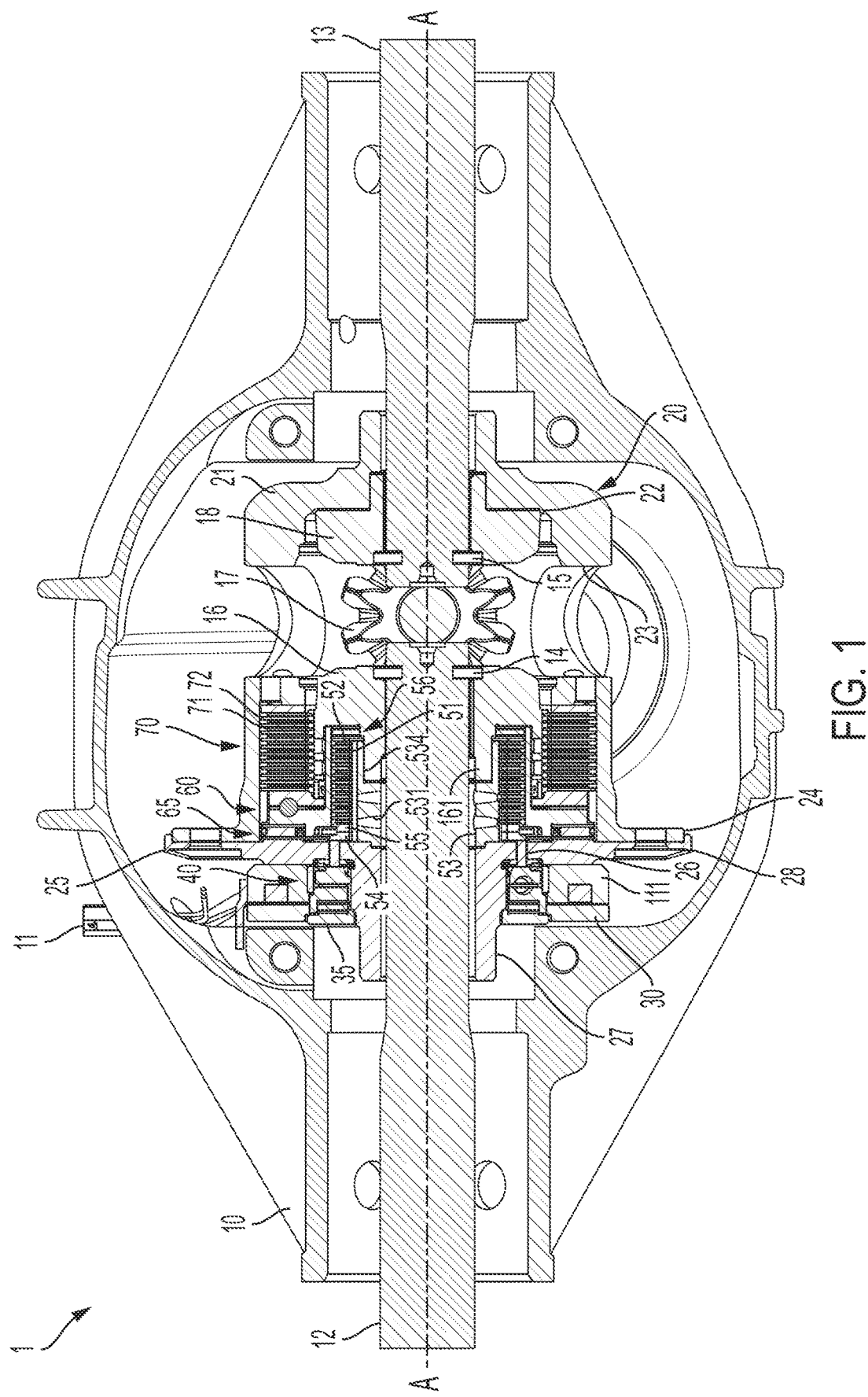
FIG. 1 is a cross-section view of a differential assembly.
Figure 2:
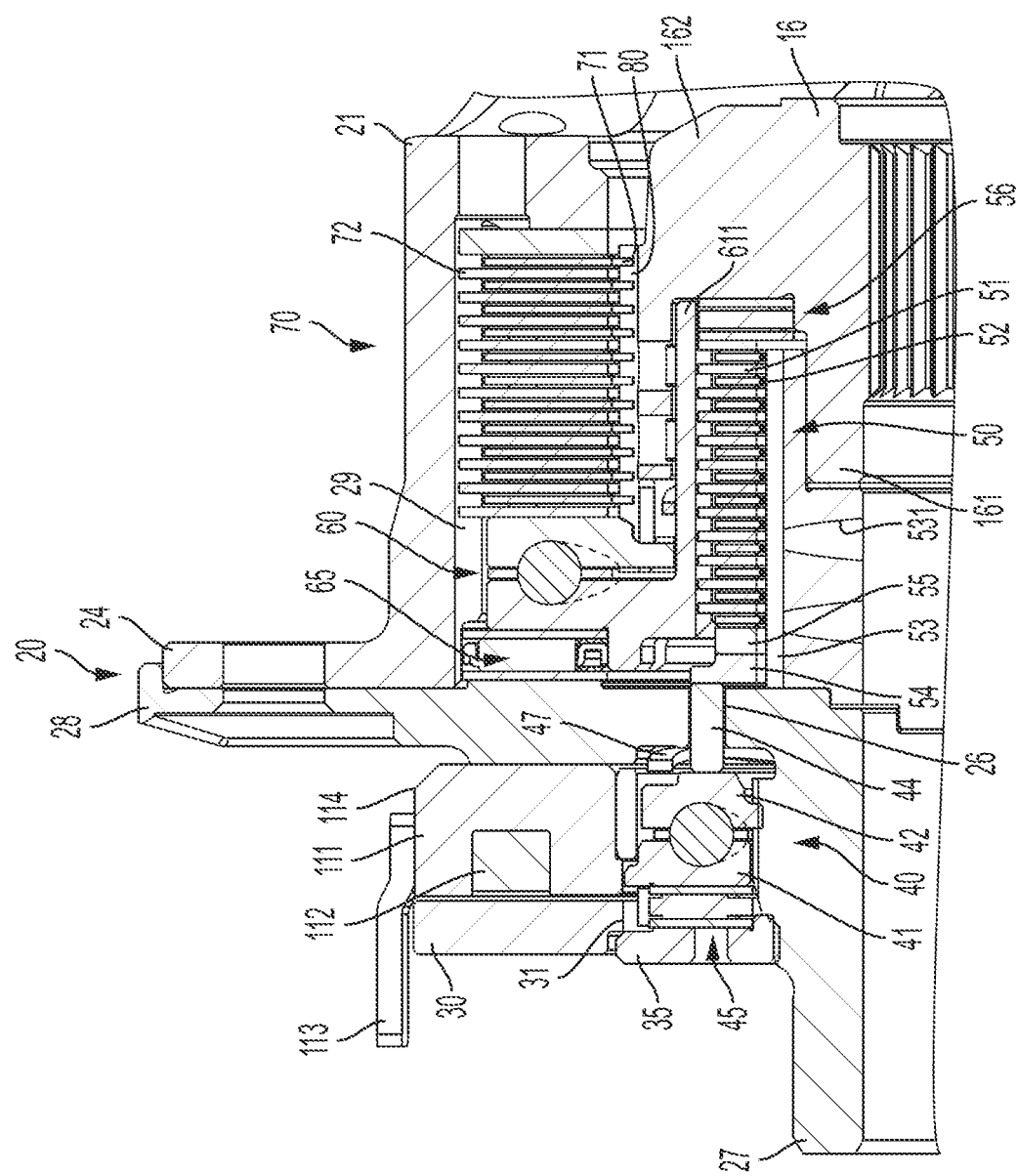
FIG. 2 is a section view of an electromagnetic differential.
Figure 3:
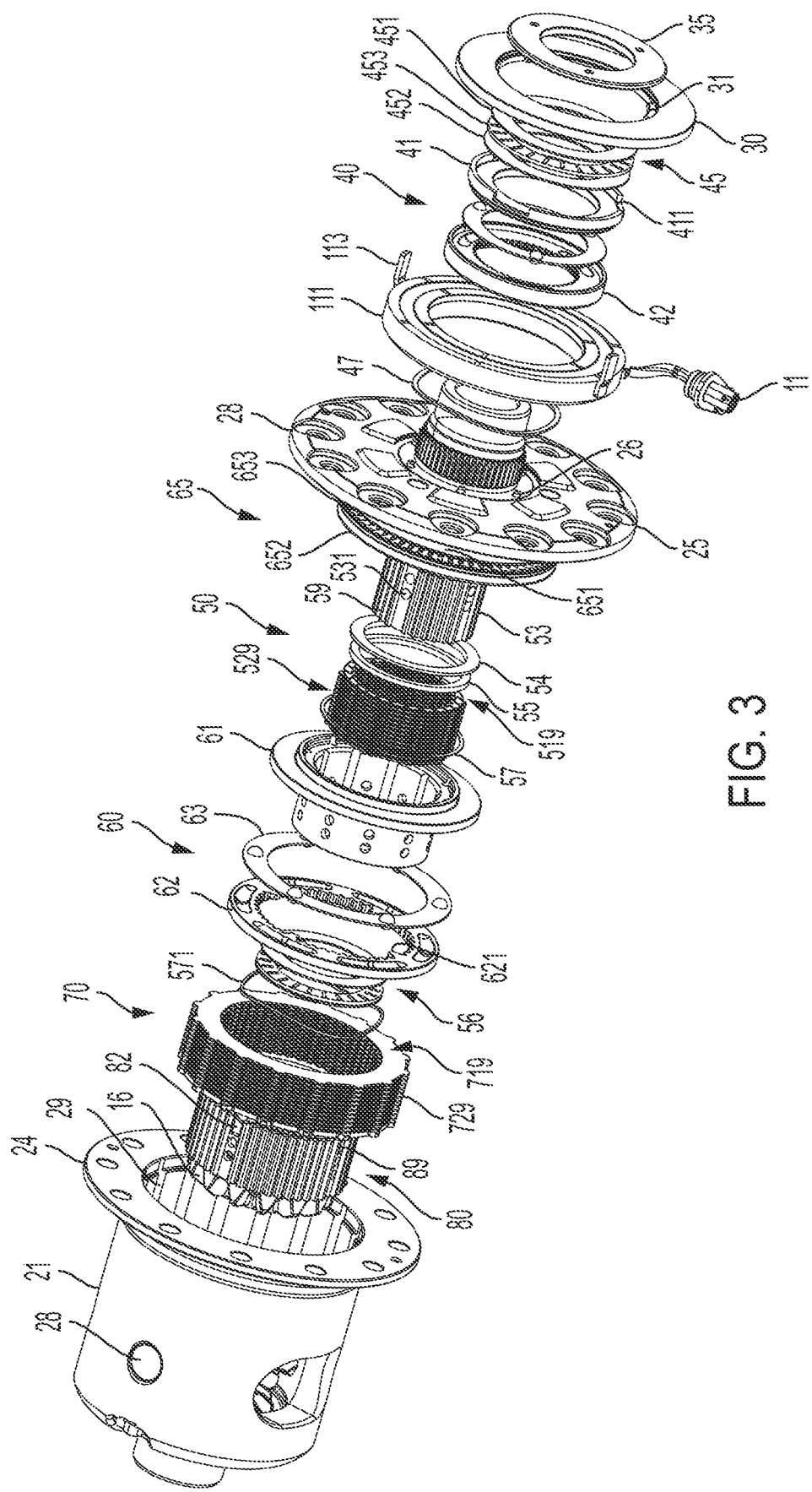
FIG. 3 is an exploded view of an electromagnetic differential.
Figure 4:
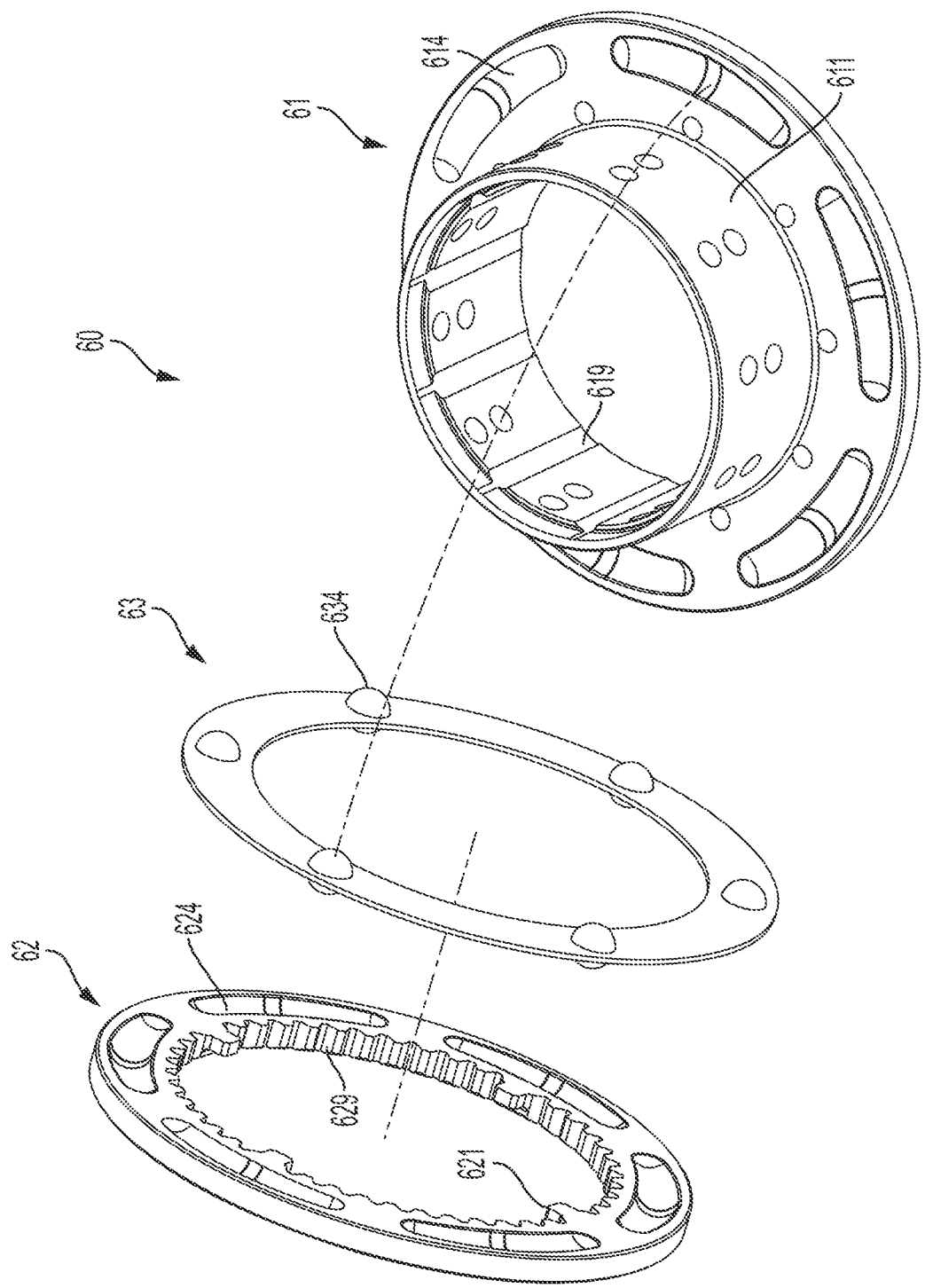
FIG. 4 is a view of a second ball ramp.
Figure 5:
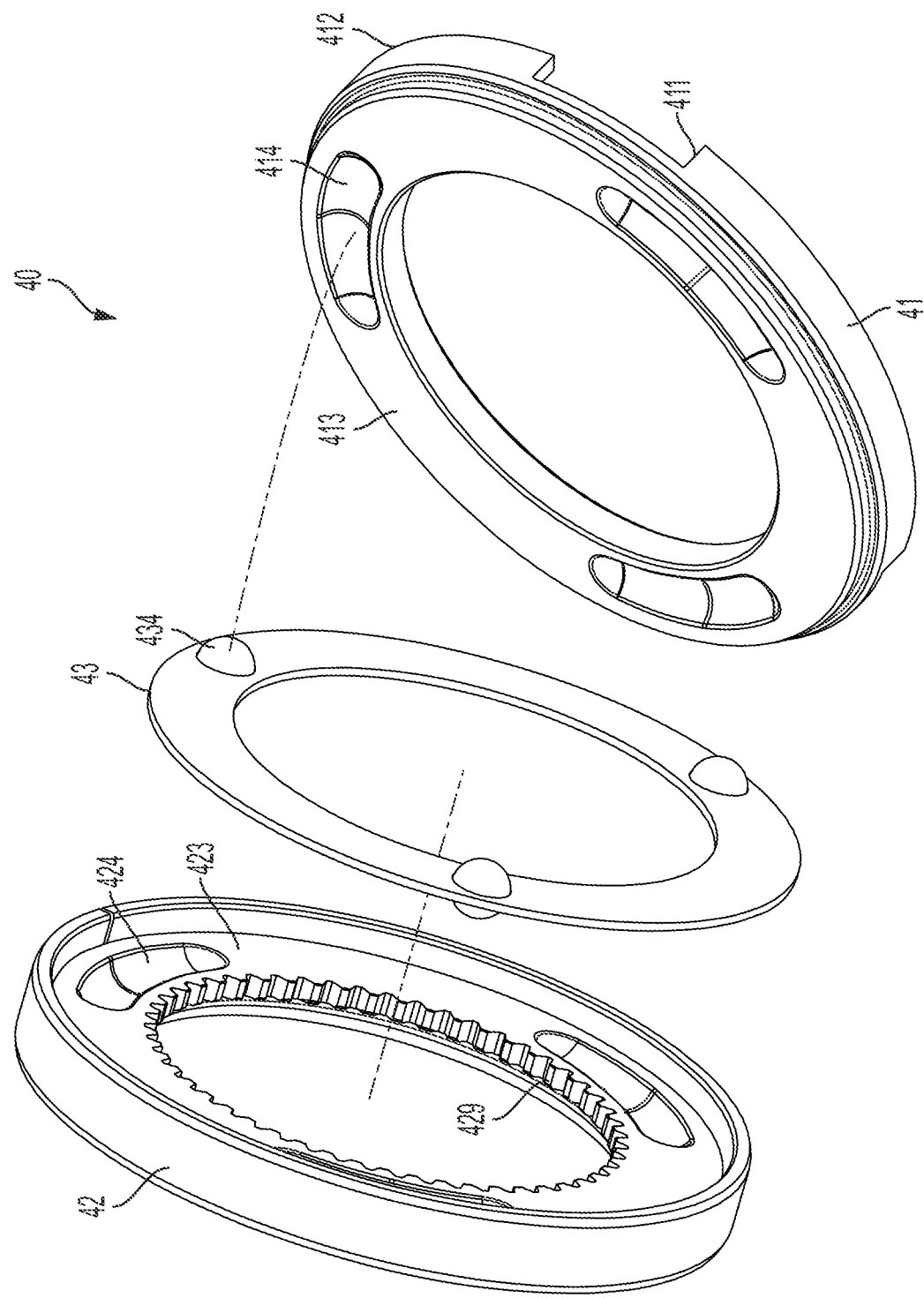
FIG. 5 is a view of a first ball ramp.

While an electromagnetic differential is shown and described, it is possible to have a differential with an actuator 30 moved by other means, such as a linkage coupled to a mechanical or electromechanical motion source. The differential can comprise a main clutch 70 and a pilot clutch 50.

Differential assembly 1 can comprise a case 10 with a plug port for plug 11. Axle ports can accommodate axles 12, 13 coupled to have open or closed differentiation. When the differential is open, the axles 12, 13 can rotate at different relative speeds. However, when the differential is closed, the axles 12, 13 are locked to rotate at the same speed. Traction control techniques can be implemented.

A limited slip differential can be designed to permit replaceable clutch plates to slip when the axles 12, 13 experience too much torque from a power source such as an engine or motor. High torque output is desired. Modulation of the torque output is desired. An onboard computer can send control signals to the plug 11 to power a stator 111. A housing 114 can package a coil 112 and couple to brackets 113. Electrical control to the coil 112 impacts the magnetic force exerted on actuator 30 to draw the actuator 30 to the stator 111.

Actuator 30 can be a metal plate. Actuator 30 can be an annulus or disc. Cleats 31 can be included to drive a first plate 41 of first ball ramp 40. First plate 41 can comprise notches 411 in rim 412 to be driven by cleats 31. When the actuator 30 is moved by the stator 111, the cleats 31 can slide in the notches 411 to pull or push the first plate 41 towards the second plate 42. First plate 41 can comprise several pockets 414 distributed in a surface 413. Second plate 42 can also comprise pockets 424 distributed in a surface 423. A set of balls 434 can be seated in opposing pockets 414, 424. Balls 434 can be arrayed in a shim 43, mold, or tray. Pockets 414, 424 can be angled more or less steeply, based on design choice, to control how quickly balls 434 ramp up in the pockets 414, 424.

When the stator 111 actuates the actuator 30, or another linkage or actuation device pushes the actuator 30, the retainer 35 that is secured to the carrier lid 25 serves as a travel limit to the first plate 41. The set of balls 434 ramp up in the pockets 414, 424 to a position pushing the second plate 42 against the carrier lid 25 and pushing the first plate 41 against the retainer 35. This causes the second plate 42 to also push on one or more piston 44 passing through the carrier lid 25. Second plate 42 can be secured against rotation by spline coupling teeth 429 to grooves in the neck 27 of carrier lid 25. Rotation of first plate 41 during the ramping up of the set of balls 434 can be facilitated by a needle bearing assembly 45. Needle bearing assembly 45 can adjoin retainer 35 and first plate 41. Needle bearing assembly 45 can comprise races 451, 452, and needle array 453.

A wave spring 47 can be included to push second plate 42 away from carrier lid 25 to allow piston 44 to slide to a disengaged position when the differential is open. The natural tendency of a clutch pack to open up, or spring apart, also called its compliance, can move the piston 44 when the stator 111 is not electrified and the differential is open.

Differential or electromagnetic differential can comprise the first ball ramp 40 and a second ball ramp 60. As part of the compact packaging, the first ball ramp 40 is on a first side of the carrier 20, on its outside. The second ball ramp 60 is in the carrier 20, in a pocket 22 of main carrier 21. Carrier 20 can be two or more pieces to secure the components of the differentiating elements. Carrier lid 25 is shown with piston holes 26 for one or more pistons 44. Footings for the stator 111 an be included. A neck 27 can adjoin an axle 12. A coupling rim 28 can secure carrier lid 25 to a corresponding main carrier rim 24. Main carrier 21 can also include a neck for adjoining axle 13. Additional features that can be a matter of design choice can comprise formations 22 for seating side gear 18 in main carrier 21. Windows 23 can also be included for lubrication or mounting. For example, a pinion shaft 28 for mounting a pinion gear 17 can be seated in the main carrier 21. Axles 12, 13 can be secured via snap rings 14, 15, bushings, shims, or the like, to first and second side gears 16, 17. The number of pinion gears 17 an be a matter of design choice.

The first ball ramp 40 can be on one side of the carrier lid 25 and the second ball ramp 60 can be on a second side of the carrier lid 25. The differential assembly 1 achieves a compact profile by this arrangement. Case 10 can even be symmetrical. The point of pinion rotation, or point of differentiation, can be off-center in the case 10.

The disclosure proposes using an electromagnetic actuation for the limited slip clutch pack. Also proposed, is that the limited slip clutch pack be broken into a main clutch 70 and a pilot clutch 50. An electronic control unit ("ECU") determines the stator current value of stator 111 based on one or more of differential oil temperature, wheel speed, vehicle speed, steering angle, and accelerator position. Stator 111, a non-rotating part, generates electromagnetic force on armature 30, a rotating part, which results in stator torque generated in armature 30. This stator torque is amplified through a first ball ramp 40 and a pilot clutch 50.

Pilot clutch 50 can comprise a pack of discs. First discs 51 can be interleaved, also called indexed, with second discs 52. First discs 51 can be splined on an indexer 53 via an arrangement of grooves 59 and inward-facing teeth 519. Indexer 53 can surround axle 12, can include lubrication ports 531, and can include a lip 534 that surrounds a portion of side gear neck 16. First discs 51 can slide in the grooves 59 of the indexer 53 when the one or more pistons 44 push on first discs 51. Thrust rings 54, 55 can be included between the one or more pistons 44 and the first of the first discs 51. Wave springs 57, 571 can be included to help push the differential to open. Additional bearing assemblies 56, 65 can be included to facilitate rotation against otherwise stationary surfaces or surfaces that would otherwise rotate at a different rate of speed but for closing the differential.

Second discs 52 can be gripped by first discs 51 as first discs 51 slide in grooves of indexer 53. Second discs 52 include outward-facing teeth 529 that can slide in slots 619 formed in a indexing neck 611 of second ball ramp 60. A rim, stake, shim, snap ring, or other travel limit limits the sliding of the first and second discs 51, 52 so that the compression actuates the second ball ramp 60. A second bearing 56 can be seated in a pocket of side gear 16 or against head 162 of side gear 16. Bearing 56 can comprise races and bearing inserts to allow relative rotation when the differential is open. For example, an additional bearing assembly with races 651, 652 and bearing inserts 653 can adjoin carrier lid 25 and second ball ramp 60.

Second ball ramp 60 actuates when the pilot clutch 50 acts on it. The second discs 52 gripping the first discs 51 pulls the first plate 61 of second ball ramp 60 towards second plate 62 to cause balls 634 to ramp up in pockets 614, 624. Pockets 614, 624 can be angled as a matter of design choice to more or less steeply engage. So, too, the number of balls 634 and pockets 614, 624 can be a matter of design choice to impact the amount of modulation, or computer control, to situationally open or close the differential. That is, as an alternative to a binary on/off or open/closed differential, it is possible to have more or less open or closing of the differential, which impacts the amount of differentiation.

First plate 61 of second ball ramp 60 being clutched by the pilot clutch 50 engages first plate 61 with the balls 634. Balls can be set in a shim 63, mold or tray. Balls 634 ramp up in pockets 624 of second plate 62. This pushes second plate 62 towards main clutch 70 to compress its clutch discs 71, 72. Second plate 62 can comprise inward-facing guides 621 to ride in pockets 82 of gear indexer 80. Pockets 82 can comprise a travel limit as a rim, ledge or the like. Inward-facing teeth 629 can be included on second plate 62 to slide in grooves 89 of gear indexer 80. Main clutch 70 can include inward-facing teeth 719 on first clutch discs 71 to slide in grooves 89 of gear indexer 80. Exterior-facing teeth 729 can slide in interior slots 29 of main carrier 21. So, the main clutch 70 can be splined to carrier 20. Gear indexer 80 can be anchored or integrally formed to main gear 16 as by coupling, pressing, staking, or integral molding, or machining, among other options. Gear indexer 80 can extend from head 162. Gear indexer 80 can surround all or a portion of neck 161 of gear 16. Head 162 can comprise gear teeth for coupling to pinion gears 17 and second side gear 18. Neck 161 can surround a portion of axle 12.

Indexing neck 611 can extend from first plate 61. First plate 61 can comprise a disc or annulus with the indexing neck 611 extending therefrom. First plate 61 can include a number of lubrication pass-throughs. Indexing neck 611 can be sized for torque transfer. The length of the Indexing neck 611 can be increased to increase the number of clutch discs that can be accommodated along the length of the indexing neck 611. The diameter of indexing neck 611 can also be adjusted to impact the mean effective radius of the pilot clutch 50.

The radius of the pilot clutch 50 impacts the package size of the differential, and so too, the radius of the main clutch 70. But, the torque density of the differential can be controlled by the number of first and second discs 51, 52, 61, 62, the mean effective radius of those first and second discs 51, 52, 61, 62, and the grip (friction coefficient) of the first and second discs 51, 52, 61, 62. So, to get more torque density in a small space, a designer can trade between the axial length of the main and pilot clutches 70, 50 and the radius of each of the main and pilot clutches 70, 50. The torque generated by the pilot and main clutches 50, 70 impacts the strength of the torque transfer and the amount of slip and the torque at which slip occurs. So, the ability to package the pilot clutch 50 radially within the main clutch 70 allows some efficient and compact torque transfer.

It can be said that the pilot clutch plates (first and second discs 51, 52) are axially coextensive with the main clutch plates (first and second discs 71, 62). It can also be said that the pilot clutch plates (first and second discs 51, 52) surround a main axis A-A of the differential, and the main clutch plates (first and second discs 71, 72) are radially stacked to surround a portion of the pilot clutch plates (first and second discs 51, 52). The pilot clutch plates (first and second discs 51, 52) can be said to be axially coextensive with the main clutch plates (first and second discs 71, 72). The pilot clutch plates can be said to surround the main axis A-A of the differential. And, main clutch plates can be said to be radially stacked to surround a portion of the pilot clutch plates. By packing the pilot clutch 50 within the main clutch 70, the overall differential is more compact and lighter than serial packaging of clutch plates with ball ramps. And, rods traversing the package are eliminated. And, more coupling surfaces are available than when a cone clutch is used side-by-side with a clutch pack of clutch discs. The differential herein makes good use of axial space.

An additional packaging benefit is accomplished by placing the stator 111 at least partially surrounding the stator-actuated first ball ramp 40 around the main axis A-A of differential. The radial space around the main axis A-A is efficiently used. The height of carrier 20 required for packaging the at least two side gears 16, 18 and two or more pinion gears 17 can be efficiently used or slightly expanded to accommodate the stator 111 and main clutch 70 radially around the side gear 16. It can be said that stator 111 at least partially surrounds the stator-actuated first ball ramp 40 around a main axis A-A of differential.

First and second discs 51, 52, 61, 62 can be either metal on metal or metal on friction material such as an organic or inorganic coating or texturing. Torque output can be "amplified" by the use of the pilot clutch 50. With more clutch plates (first and second discs 51, 52) comes more compliance and more gain. The more plates tend to spring apart and separate more, which increases the amount of control that can be applied to close the pilot clutch 50. While requiring more control, the control that is applied is easier to control. And, the more plates tend to spring apart quicker than, say, a steep-angled cone clutch. The torque output does not change as immediately as it would in, say, a cone clutch having two cones. But, the summation of the number of clutch discs, mean effective radius of the clutch discs, and the grip allows more granular control of the differential in view of the operating conditions. The pilot torque from the pilot clutch 50 and first ball ramp 40 is amplified through the second ball ramp 60 and the main clutch 70 to get a desired bias torque in a compact space. Stator force, and hence differential open or close modulation, is kept variable through providing variable stator current to plug 11.

The main clutch 70 can be friction material based to control torque output. When current is withdrawn from stator 111, electromagnetic force no longer acts on armature 30. The pilot and main spring force (compliance) overcome the residual magnetic force and exert force on their respective ball ramp plates 41, 42, 61, 62 to disengage the balls 434, 634 from the ramps in the pockets 414, 614, 424, 624. The pilot ball ramp (first ball ramp 40) disengages, causing the pilot clutch 50, main ball ramp (second ball ramp 60), and main clutch 70 to also disengage. The differential then acts as an open differential.

So, it is possible to vary the number of pilot clutch surfaces (via first and second discs 51, 52) and main clutch surfaces (via first and second discs 71, 72), vary the number of balls 434, 634 and ramp surfaces in pockets 614, 624, 514, 524, and to vary the ball ramp angle to design for bias torque requirements in the available packaging space. Stator force can also be variable by providing variable stator current.

An arrangement of an electromagnetic-LSD comprises a double ball ramp actuator having a double-deck clutch pack architecture to achieve high torque capacity. The first ball ramp 40 (pilot ball ramp) can constitute an actuator that ramps-up upon energization of a stator 111. The first ball ramp 40 actuates the pilot clutch 50, a clutch pack assembly, which further ramps-up the second ball ramp 60. The second ball ramp 60 actuates the main clutch 70, a second clutch pack assembly, which executes the limited slip differentiating action.

The double-deck arrangement of the main and pilot clutches 70, 50 in the eMLSD actuator are shown to achieve higher clutch torque capacity while being compact. Required bias torque can be generated through electromagnetic actuation. Double ball ramp can be used to generate required main clutch torque. Ball ramp profile can be designed to reduce drag torque. A double deck type of clutch (main and pilot clutch 70, 50) arrangement has been used in this architecture. This type of arrangement accommodates sufficient pilot and main clutch surfaces. It is possible to design the differential so that the pilot and main clutch 50, 70 actuation force is near to the mean effective radius of the clutch pack so as to maximize the radial outlay for maximum toque output in a small space.

The reliability of the system is high due to low number of parts. And, the differential assembly is enclosed in a carrier. Therefore, the effect of dust and environment on performance is low. Response time of the system at −40° C. can be better than an electrohydraulic system as resistance for generating required force is low. Cost of the system is low.

A differential can comprise a pilot clutch 50, a main clutch 70, a first ball ramp 40 configured to act on the pilot clutch 50, and a second ball ramp 60 configured to actuate the main clutch 70 when the pilot clutch 50 acts on the second ball ramp 60.

A movable armature 30 can be configured to actuate the first ball ramp 40. The pilot clutch 50 can comprises pilot clutch plates (first and second discs 51, 52) interleaved to an indexer 53. The pilot clutch plates can be configured to compress the second ball ramp 60.

The main clutch 70 can comprise main clutch plates (first and second discs 71, 72) interleaved to act on a side gear 16 of the differential.

An electromagnetic differential can be said to comprise a carrier 20. A stator 111 can be mounted on the carrier 20. A pilot clutch 50 can be in the carrier 20. A main clutch 70 can be in the carrier 20. A stator-actuated first ball ramp 40 can be mounted on the carrier 20 and can be configured to act on the pilot clutch 40. A second ball ramp 60 can be in the carrier 20 and can be configured to actuate the main clutch 70 when the pilot clutch 40 is acted on.

The stator 111 can at least partially surround the stator-actuated first ball ramp 40 on an exterior of the carrier 20. The stator-actuated first ball ramp 40 can actuate at least one piston 44 through the carrier 20 to act on the pilot clutch 50. The second ball ramp 60 can surround a portion of the pilot clutch 50. The main clutch 70 can surround at least a second portion of the pilot clutch 50.

A side gear 16 can comprise a head 162 and a neck 161. The pilot clutch 50 can be configured around a portion of the neck 161. The main clutch 70 can be configured around a portion of the head 162. Main clutch 70 can comprise main clutch plates (first and second discs 71, 72) on a gear indexer 80, the main clutch plates configured to act on the head 16 to open or close the differential, as controlled.

An electromagnetic differential can comprise a carrier 20. A first side gear 16 and a second side gear 18 can be installed in the carrier 20. A stator 111 can be mounted on the carrier 20. A pilot clutch 50 can be in the carrier 20. The pilot clutch 50 can surround a portion of the first side gear 16. A main clutch 70 can be in the carrier 20 surrounding a portion of the pilot clutch 50 and surrounding a portion of the first side gear 16. A stator-actuated first ball ramp 40 can be on the carrier 20 and can be configured to act on the pilot clutch 50. A second ball ramp 60 can be in the carrier 20 and can be configured to actuate the main clutch 70 when the pilot clutch 50 is acted on.

The second ball ramp 60 can surround a second portion of the pilot clutch 50. The second ball ramp 60 can comprise an indexing neck 611 splined to the pilot clutch 50.

A piston 44 can pass through the carrier 20. The piston 44 can be configured to transfer force from the stator-actuated first ball ramp 40 to the pilot clutch 50.

A method for actuating an electromagnetic differential can comprising energizing a first ball ramp 40 with a stator 111, actuating a pilot clutch 50 via the first ball ramp 40, actuating a second ball ramp 60 via the pilot clutch 50, and actuating a main clutch pack 70 via the second ball ramp 60. The method can further comprise determining a control signal to the stator 111 by processing one or more of a differential oil temperature, a wheel speed, a vehicle speed, a steering angle and an accelerator position. The control signal to the stator 111 can control a torque output of the electromagnetic differential.

Other implementations will be apparent to those skilled in the art from consideration of the specification and practice of the examples disclosed herein.

What is claimed is:

1. A differential comprising:
   a carrier;
   a stator assembly;
   a pilot clutch comprising pilot clutch plates surrounding a main axis of the differential;
   a main clutch comprising main clutch plates radially positioned to surround a portion of the pilot clutch plates;
   a first ball ramp configured to act on the pilot clutch; and
   a second ball ramp configured to actuate the main clutch when the pilot clutch acts on the second ball ramp,
   wherein both the stator assembly and the first ball ramp are located outside of the carrier, and
   wherein the first ball ramp and the second ball ramp are axially offset.

2. The differential of claim 1, wherein the pilot clutch plates are interleaved to an indexer, the pilot clutch plates configured to compress the second ball ramp.

3. The differential of claim 1, further comprising a side gear, wherein the main clutch plates are interleaved to act on the side gear of the differential.

4. The differential of claim 3, wherein the pilot clutch plates are axially coextensive with the main clutch plates.

5. The differential of claim 1, wherein the stator assembly at least partially surrounds the first ball ramp around the main axis of the differential.

6. The differential of claim 1, comprising a movable armature configured to actuate the first ball ramp.

7. An electromagnetic differential comprising:
   a carrier;
   a stator mounted on the carrier;
   a pilot clutch in the carrier;
   a main clutch in the carrier;
   a stator-actuated first ball ramp on the carrier configured to act on the pilot clutch; and
   a second ball ramp in the carrier configured to actuate the main clutch when the pilot clutch is acted on,
   wherein both the stator and the stator-actuated first ball ramp are located on an exterior of the carrier, and
   wherein the first ball ramp and the second ball ramp are axially offset.

8. The electromagnetic differential of claim 7, wherein the stator at least partially surrounds the stator-actuated first ball ramp.

9. The electromagnetic differential of claim 7, wherein the stator-actuated first ball ramp actuates a piston through the carrier to act on the pilot clutch.

10. The electromagnetic differential of claim 7, wherein the second ball ramp surrounds a portion of the pilot clutch.

11. The electromagnetic differential of claim 10, wherein the main clutch surrounds a second portion of the pilot clutch.

12. The electromagnetic differential of claim 7, further comprising a side gear, the side gear comprising a head and a neck, wherein the pilot clutch is configured around a portion of the neck, and wherein the main clutch is configured around a portion of the head.

13. The electromagnetic differential of claim 12, wherein the main clutch comprises main clutch plates on a gear indexer, the main clutch plates configured to act on the head.

14. An electromagnetic differential comprising:
    a carrier;
    a first side gear and a second side gear in the carrier;
    a stator mounted on the carrier;
    a pilot clutch in the carrier surrounding a portion of the first side gear;
    a main clutch in the carrier surrounding a portion of the pilot clutch and surrounding a second portion of the first side gear;
    a stator-actuated first ball ramp on the carrier configured to act on the pilot clutch; and
    a second ball ramp inside the carrier configured to actuate the main clutch when the pilot clutch is acted on,
    wherein both the stator and the stator-actuated first ball ramp are located on an exterior of the carrier.

15. The electromagnetic differential of claim 14, wherein the second ball ramp surrounds a second portion of the pilot clutch.

16. The electromagnetic differential of claim 15, wherein the second ball ramp comprises an indexer neck splined to the pilot clutch.

17. The electromagnetic differential of claim 14, comprising a piston passing through the carrier, the piston configured to transfer force from the stator-actuated first ball ramp to the pilot clutch.

18. A method for actuating an electromagnetic differential comprising:
    energizing a first ball ramp with a stator, the first ball ramp and the stator being located on an exterior of a carrier;
    actuating a pilot clutch via the first ball ramp, the pilot clutch comprising pilot clutch plates surrounding a main axis of the differential within the carrier;
    actuating a second ball ramp inside the carrier via the pilot clutch; and
    actuating a main clutch pack comprising main clutch plates radially positioned to surround a portion of the pilot clutch plates via the second ball ramp.

19. The method of claim 18, further comprising determining a control signal to the stator by processing one or more of a differential oil temperature, a wheel speed, a vehicle speed, a steering angle and an accelerator position, the control signal to the stator controlling a torque output of the electromagnetic differential.

\* \* \* \* \*